(12) United States Patent
Samperi

(10) Patent No.: US 12,390,717 B2
(45) Date of Patent: Aug. 19, 2025

(54) GAME CONTROLLER WITH ONBOARD CALIBRATION

(71) Applicant: Panda Hardware LLC, Spring House, PA (US)

(72) Inventor: Matthew Samperi, Lansdale, PA (US)

(73) Assignee: Panda Hardware LLC, Spring House, PA (US)

( * ) Notice: Subject to any disclaimer, the term of this patent is extended or adjusted under 35 U.S.C. 154(b) by 356 days.

(21) Appl. No.: 17/966,195

(22) Filed: Oct. 14, 2022

(65) Prior Publication Data

US 2023/0148072 A1     May 11, 2023

Related U.S. Application Data

(60) Provisional application No. 63/277,304, filed on Nov. 9, 2021.

(51) Int. Cl.
| | |
|---|---|
| *A63F 13/22* | (2014.01) |
| *A63F 13/24* | (2014.01) |
| *A63F 13/533* | (2014.01) |

(52) U.S. Cl.
CPC .............. *A63F 13/22* (2014.09); *A63F 13/24* (2014.09); *A63F 13/533* (2014.09)

(58) Field of Classification Search
CPC ........ A63F 13/22; A63F 13/245; A63F 13/26; A63F 13/42; A63F 13/48; A63F 2300/301; A63F 2300/1006; A63F 2300/1018; A63F 2300/1062; A63F 2300/6045; G06F 3/033; G06F 3/0338; G06F 3/0346; G06F 3/038
See application file for complete search history.

(56) References Cited

U.S. PATENT DOCUMENTS

| | | |
|---|---|---|
| 6,004,210 A | 12/1999 | Shinohara |
| 6,203,432 B1 * | 3/2001 | Roberts ................. A63F 13/803 |
| | | 463/36 |
| 6,580,418 B1 * | 6/2003 | Grome .................... A63F 13/22 |
| | | 345/161 |
| 6,803,676 B2 | 10/2004 | Tanaka et al. |
| 8,366,549 B2 | 2/2013 | Garcia |

(Continued)

OTHER PUBLICATIONS

VEX ARM® Cortex®-based Microcontroller and VEXnet Joystick User Guide; https://www.roboticseducation.org/documents/2013/06/cortex-user-guide.pdf/.

(Continued)

*Primary Examiner* — Lawrence S Galka
(74) *Attorney, Agent, or Firm* — James P. Muraff; McDonald Hopkins LLC

(57) ABSTRACT

A game controller with onboard calibration. The game controller includes lights that illuminate to prompt the user to interact with the game controller by pressing one or more triggers and/or by moving one or more joysticks in certain directions. The game controller uses the inputs it receives from the user to calibrate the trigger(s) and/or joystick(s). The software which performs this calibration is onboard the game controller. The game controller can be calibrated without having to rely on any game console. The game controller can be calibrated while being connected to a game console, such as an older game console, that does not provide any type of game controller calibration mode for that game controller.

14 Claims, 2 Drawing Sheets

(56) References Cited

U.S. PATENT DOCUMENTS

| | | |
|---|---|---|
| 9,459,276 B2 | 10/2016 | Joseph |
| 10,556,174 B2 | 2/2020 | Nelson et al. |
| 10,799,789 B2 | 10/2020 | Oizumi et al. |
| 2009/0310027 A1 | 12/2009 | Fleming |
| 2019/0118088 A1* | 4/2019 | Nelson ................ G06F 3/0383 |
| 2023/0182007 A1* | 6/2023 | Zhang ................... A63F 13/42 463/37 |

OTHER PUBLICATIONS

Greenwald, Will; "PowerA Spectra Infinity Enhanced Wired Controller for Xbox Series X|S Review", Sep. 23, 2021 (Sep. 23, 2021), XP002808596, Retrieved from the Internet: URL:https://www.pcmag.com/reviews/powera-spectra-infinity-enhanced-wired-controllerfor-xbox-series-xs; [retrieved on Feb. 9, 2023].

Extended European Search Report that issued in connection with corresponding European Patent Application No. 22203195.7 on Feb. 24, 2023.

\* cited by examiner

GAME CONTROLLER WITH ONBOARD CALIBRATION

RELATED APPLICATION (PRIORITY CLAIM)

The present application claims the benefit of U.S. Provisional Application Ser. No. 63/277,304, filed Nov. 9, 2021, which is hereby incorporated by reference in its entirety.

BACKGROUND

The present invention generally relates to game controllers, and more specifically relates to a game controller having onboard calibration.

Newer game consoles provide the ability to calibrate a game controller that is connected (either via wired or wireless connection) to the game console. Typically, a user will use the game controller to direct the game console enter a game controller calibration mode during which mode the game console will use the television screen to prompt the user to press certain buttons or triggers on the game controller or to move directional controls, such as joysticks, etc., in certain directions. The game console uses the game controller inputs it receives from the user to calibrate the game controller.

Older game consoles do not have a calibration mode. As such, a user has no way to calibrate his or her game controller for use with an older game console.

SUMMARY

One object of an embodiment of the present invention is to provide a game controller that has onboard calibration.

Another object of an embodiment of the present invention is to provide a game controller that can be calibrated without having to rely on any game console or television screen.

Still another object of an embodiment of the present invention is to provide a game controller that can be calibrated while being connected to a game console that does not provide any type of game controller calibration mode for that game controller.

Briefly, an embodiment of the present invention provides a game controller which includes lights that illuminate to prompt the user to interact with the game controller by pressing one or more triggers and/or by moving one or more joysticks in certain directions. The game controller uses the inputs it receives from the user to calibrate the trigger(s) and/or joystick(s). The software which performs this calibration (i.e., by illuminating the lights, receiving the inputs and calibrating the controls) is onboard the game controller. As such, the game controller can be calibrated without having to rely on any game console. The game controller can be calibrated while being connected to a game console, such as an older game console, that does not provide any type of game controller calibration mode for that game controller.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
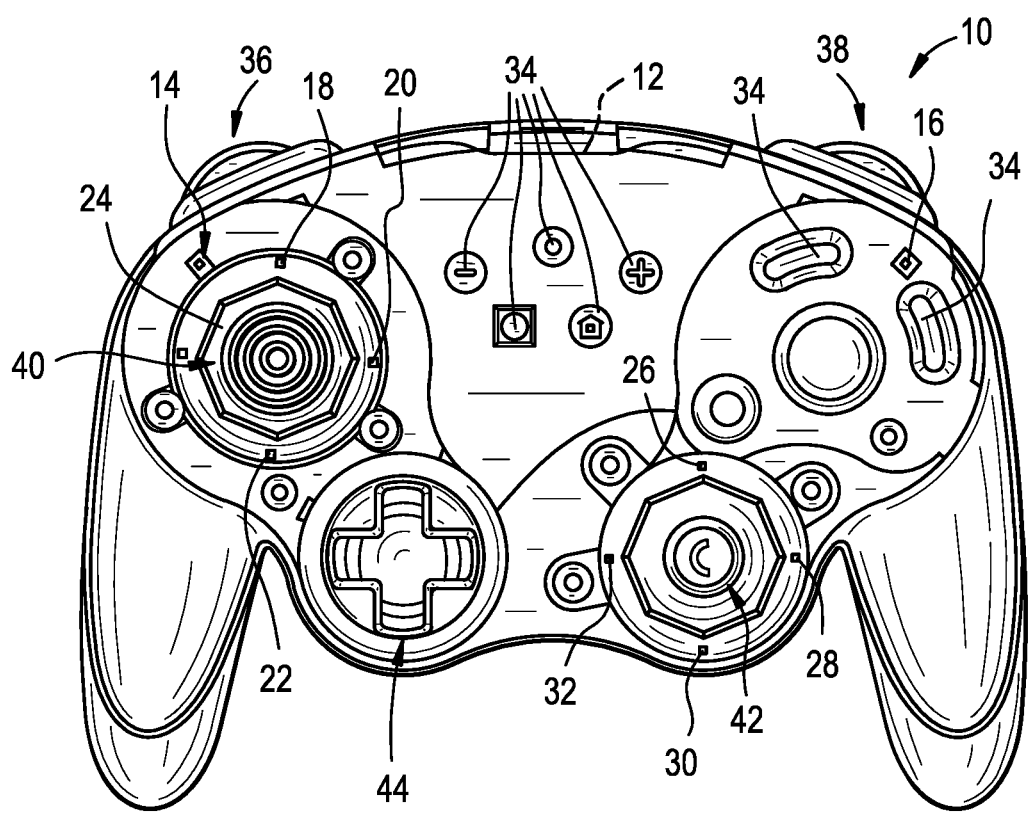
FIG. 1 provides a top view of a game controller that is in accordance with an embodiment of the present invention, wherein the game controller includes lights that the game controller illuminates to effectively guide the user through a calibration mode.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

FIG. 1 provides a top view of a game controller 10 that is in accordance with an embodiment of the present invention. The game controller 10 has onboard calibration and at least one user interactive control. Specifically, there is software 12 that runs inside the game controller 10 that illuminates lights 14, 16, 18, 20, 22, 24, 26, 28, 30, 32 on the game controller 10 to effectively guide a user through a calibration mode by having the user press certain buttons 34, triggers 36, 38, etc. and move certain joysticks 40, 42, etc. in certain directions. While the user performs these actions on the game controller 10, the game controller 10 receives these user responses (i.e., inputs) and uses these inputs to calibrate the game controller 10.

FIG. 1 shows just one example of a game controller 10 that could employ this technology. As shown, the game controller 10 has two analog joysticks 40, 42 and two analog triggers 36, 38, in addition to a plurality of digital push buttons 34 and a digital directional control 44. Lights 14, 16, 18, 20, 22, 24, 26, 28, 30, 32 are provided adjacent the analog controls, namely the two joysticks 40, 42 and the two triggers 36, 38. The lights 14, 16 associated with each of the triggers 36, 38 illuminate to direct the user to press that particular trigger 36 or 38. The lights 18, 20, 22, 24, 26, 28, 30, 32 associated with each of the joysticks 40, 42 illuminate to direct the user to move each of the joysticks 40, 42 in certain directions. While the user performs these actions on the game controller 10, the game controller 10 receives these user responses (i.e., inputs) and uses these inputs to calibrate the different analog inputs 36, 38, 40, 42 on the game controller 10.

Preferably, the software 12 running inside the controller 10 is configured such that the game controller 10 starts this calibration mode upon the user intentionally pressing certain buttons and/or triggers, etc. in a certain order. Alternatively, a switch or button can be provided, such as on the bottom of the game controller 10, with which the user can interact in order to have the game controller 10 initiate the calibration mode.

As a specific example with regard to the game controller 10 shown in FIG. 1, the software 12 could be configured such that when the game controller 10 enters the calibration mode the light 14 associated with the left trigger 36 illuminates. After the user presses the left trigger 36, the light 14 associated with the left trigger 36 goes out and the light 16 associated with the right trigger 38 illuminates. After the user presses the right trigger 36, the light 16 associated with the right trigger 38 goes out and one of the lights 18 associated with the left joystick 40 illuminates. Specifically, preferably the top light 18 associated with the left joystick 40 illuminates. After the user presses the left joystick 40 up, the top light 18 goes out and the light 20 to the right of the left joystick 40 illuminates. After the user presses the left 40 joystick the right, the light 20 goes out and the light 22 to the bottom of the left joystick 40 illuminates. After the user presses the left joystick 40 down, the light 22 goes out and the light 24 to the left of the left joystick 40 illuminates. After the user presses the left joystick 40 to the left, the light 24 goes out and the light 26 to the top of the right joystick 42 illuminates. After the user presses the right joystick 42 up, the light 26 goes out and the light 28 to the right of the right joystick 42 illuminates. After the user presses the right joystick 42 the right, the light 28 goes out and the light 30 to the bottom of the right joystick 42 illuminates. After the user presses the right joystick 42 down, the light 30 goes out and the light 32 to the left of the right joystick 42 illuminates. After the user presses the left joystick 42 to the left, the light 32 goes out and the calibration mode is complete. At that point, all the lights 14, 16, 18, 20, 22, 24, 26, 28, 30, 32 could blink a couple times to indicate to the user that the game controller 10 was successfully calibrated. This is just one example of how the software 12 could be programmed and just one example of the specific controls that could be provided on the game controller 10. Of course, countless possibilities exist while still staying very much within the scope of the present invention. For example, different controls can be provided on the game controller 10 and/or the lights could illuminate in a different order. Furthermore, FIG. 1 shows lights being provided in four directions (up, down, right, left) for each of the joysticks 40, 42, lights can be provided for even more directions than that, such as diagonal. Regardless, the game controller 10 is configured to use the lights on the controller 10 to direct the user to perform certain actions on the game controller 10 and the game controller 10 receives these user responses (i.e., inputs) and uses them to calibrate the controls 36, 38, 40, 42 on the game controller 10.

Regarding what powers the game controller, the game controller 10 could be wireless and be configured to be powered by batteries. As such, the game controller 10 would not have to be connected to any game console to be calibrated. On the other hand, the game controller 10 could be configured to be hardwired to a game console and receive its power from the game console. Either way, the game controller 10 has software 12 onboard that is configured to perform the calibration and that calibration is not performed by the game console but rather by the game controller 10 itself.

Figure 2:
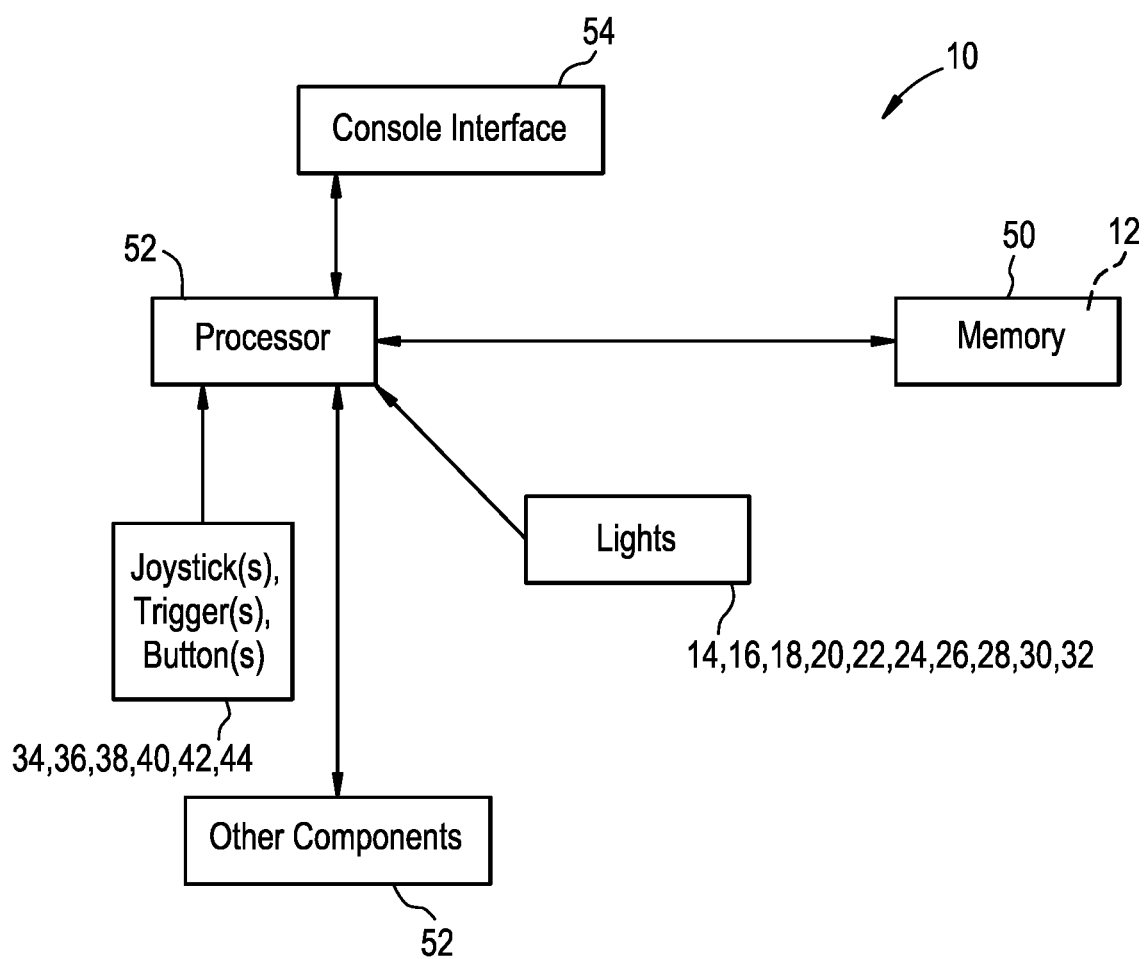
FIG. 2 is a block diagram of the game controller shown in FIG. 1.

FIG. 2 is a block diagram of the game controller 10 shown in FIG. 1 and is self-explanatory. The software 12 which runs the calibration is stored in memory 50 inside the game controller 10 and is run by a processor 52. There is a console interface 54 configured to interface with a game console. The "other components" 56 indicated in FIG. 2 could be other components not specifically related to the invention, such as force feedback components, as well as other components that are conventional regarding game controllers.

The game controller 10 has onboard calibration. As such, the game controller 10 can be calibrated without having to rely on any game console or television screen. The game controller 10 can be calibrated while being connected to a game console, such as an older game console that does not provide any type of game controller calibration mode for that game controller.

While a specific embodiment of the invention has been shown and described, it is envisioned that those skilled in the art may devise various modifications without departing from the spirit and scope of the present invention.

What is claimed is:

1. A game controller comprising:
   at least one light;
   at least one user interactive control;
   memory;
   software stored in the memory; and
   a processor, said processor configured to run the software to illuminate the at least one light to prompt the user to interact with the at least one user interactive control in order to calibrate the game controller, wherein the at least one user interactive control comprises at least one trigger, wherein the game controller is configured to illuminate the at least one light to facilitate calibration of the at least one trigger.

2. The game controller as recited in claim 1, wherein the at least one user interactive control comprises at least one joystick, wherein the game controller is configured to illuminate the at least one light to facilitate calibration of the at least one joystick.

3. The game controller as recited in claim 1, wherein the game controller is configured to use inputs the game controller receives from the user via the at least one user interactive control to calibrate the at least one user interactive control.

4. The game controller as recited in claim 1, wherein the game controller is configured to be calibrated without having to rely on any game console or television screen.

5. The game controller as recited in claim 1, wherein the game controller is configured to be calibrated while being connected to a game console that does not provide any type of game controller calibration mode for the game controller.

6. The game controller as recited in claim 1, wherein the at least one user interactive control comprises a joystick, wherein the at least one light comprises a plurality of lights adjacent the joystick, wherein the game controller illuminates the plurality of lights adjacent the joystick to prompt a user to move the joystick in different directions in order to calibrate the joystick.

7. The game controller as recited in claim 1, wherein the at least one light comprises a plurality of lights, wherein the at least one user interactive control comprises at least one button, the at least one trigger and at least one joystick, wherein the software runs inside the game controller to illuminate lights on the game controller to guide a user through a calibration mode by having the user press the at least one button, press the at least one trigger, and move the at least one joystick in certain directions, wherein while the user performs these actions on the game controller, and the game controller uses these actions to calibrate the game controller.

8. The game controller as recited in claim 1, wherein the software is configured such that the game controller starts a calibration mode upon the user intentionally interacting with the at least one interactive control in a certain order.

9. The game controller as recited in claim 1, wherein the at least one user interactive control comprises at least one joystick, wherein the at least one light comprises a plurality of lights adjacent the joystick, wherein the game controller illuminates the plurality of lights in an order to facilitate calibration of the at least one joystick.

10. The game controller as recited in claim 1, further comprising a console interface that is configured to interface with a game console.

11. The game controller as recited in claim 1, wherein the software stored in the memory is configured to provide that the game controller has onboard calibration.

12. The game controller as recited in claim 1, wherein the at least one user interactive control comprises at least one analog control and at least digital control, wherein the at least one light is adjacent the at least one analog control.

13. A game controller comprising:
at least one light;
at least one user interactive control;
memory;
software stored in the memory; and
a processor, said processor configured to run the software to illuminate the at least one light to prompt the user to interact with the at least one user interactive control in order to calibrate the game controller, wherein the at least one user interactive control comprises two analog joysticks, two analog triggers, a plurality of digital push buttons and a digital directional control.

14. A game controller comprising:
at least one light;
at least one user interactive control;
memory;
software stored in the memory; and
a processor, said processor configured to run the software to illuminate the at least one light to prompt the user to interact with the at least one user interactive control in order to calibrate the game controller, wherein the at least one interactive control comprises at least two analog joysticks, wherein the at least one light is provided adjacent the at least two analog joysticks, the at least one light illuminates to direct the user to perform actions on the game controller, and the game controller receives these user inputs and uses these inputs to calibrate the at least two analog joysticks.

* * * * *